(12) United States Patent
Dietz et al.

(10) Patent No.: US 7,898,428 B2
(45) Date of Patent: Mar. 1, 2011

(54) SAFETY FOR MOBILE DEVICE USERS WHILE DRIVING

(75) Inventors: David Blaine Dietz, Waterloo (CA); Nagula Tharma Sangary, Waterloo (CA); Sean Bartholomew Simmons, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 345 days.

(21) Appl. No.: 12/043,495

(22) Filed: Mar. 6, 2008

(65) Prior Publication Data

US 2009/0224931 A1    Sep. 10, 2009

(51) Int. Cl.
G08B 21/00    (2006.01)

(52) U.S. Cl. .................... 340/670; 340/669; 340/686.1; 340/686.6

(58) Field of Classification Search ................. 340/670, 340/686.1, 686.6, 669
See application file for complete search history.

(56) References Cited

U.S. PATENT DOCUMENTS

| | | | |
|---|---|---|---|
| 6,311,078 B1 | 10/2001 | Hardouin | |
| 6,502,022 B1 * | 12/2002 | Chastain et al. | ............... 701/36 |
| 6,600,975 B2 | 7/2003 | Moriguchi et al. | |
| 6,687,497 B1 | 2/2004 | Parvulescu et al. | |
| 6,771,946 B1 | 8/2004 | Oyaski | |
| 7,236,776 B2 | 6/2007 | Nath et al. | |
| 2002/0151297 A1 | 10/2002 | Remboski et al. | |
| 2004/0127198 A1 | 7/2004 | Roskind et al. | |
| 2004/0198306 A1 | 10/2004 | Singh et al. | |
| 2004/0209594 A1 | 10/2004 | Naboulsi | |
| 2005/0255874 A1 * | 11/2005 | Stewart-Baxter et al. | . 455/550.1 |
| 2005/0288024 A1 | 12/2005 | Song | |
| 2006/0258294 A1 | 11/2006 | Juncker et al. | |
| 2007/0010943 A1 | 1/2007 | Pair et al. | |
| 2007/0026850 A1 | 2/2007 | Keohane et al. | |
| 2007/0072553 A1 * | 3/2007 | Barbera | ................... 455/67.11 |
| 2007/0173234 A1 | 7/2007 | Deprun | |
| 2008/0014881 A1 | 1/2008 | Engdahl et al. | |

FOREIGN PATENT DOCUMENTS

| | | |
|---|---|---|
| JP | 3110933 | 5/1991 |
| WO | 2004019646 A1 | 3/2004 |
| WO | 2008006649 A1 | 1/2008 |

OTHER PUBLICATIONS

Nokia Corporation; "Advanced Car Kit CK-7W User Guide Installation Guide"; Copyright 2007; 23 pgs.
Chittaro, Luca et al.; "Driver Distraction Caused by Mobile Devices: Studying and Reducing Safety Risks"; University of Udine, Udine, Italy; Apr. 2004; 19 pgs.
Williams, John; "Cell Phones and Driving"; Minnesota House of Representatives, Research Department; Oct. 2002; 8 pgs.
EP Extended Search and Examination Report; EP Application No. 08153671.6; Jul. 11, 2008; 5 pgs.
European Search and Examination Report; EP Application No. 08152414.2; Aug. 14, 2008; 7 pgs.

* cited by examiner

*Primary Examiner*—Travis R Hunnings

(57) ABSTRACT

A mobile device configured to have at least one function disabled when a speed of the mobile device exceeds a threshold. The mobile device includes an output component configured to provide a notification related to disabling the at least one function. The mobile device also includes a first input component configured to promote controlling whether to disable the at least one function.

22 Claims, 5 Drawing Sheets

Fig. 4
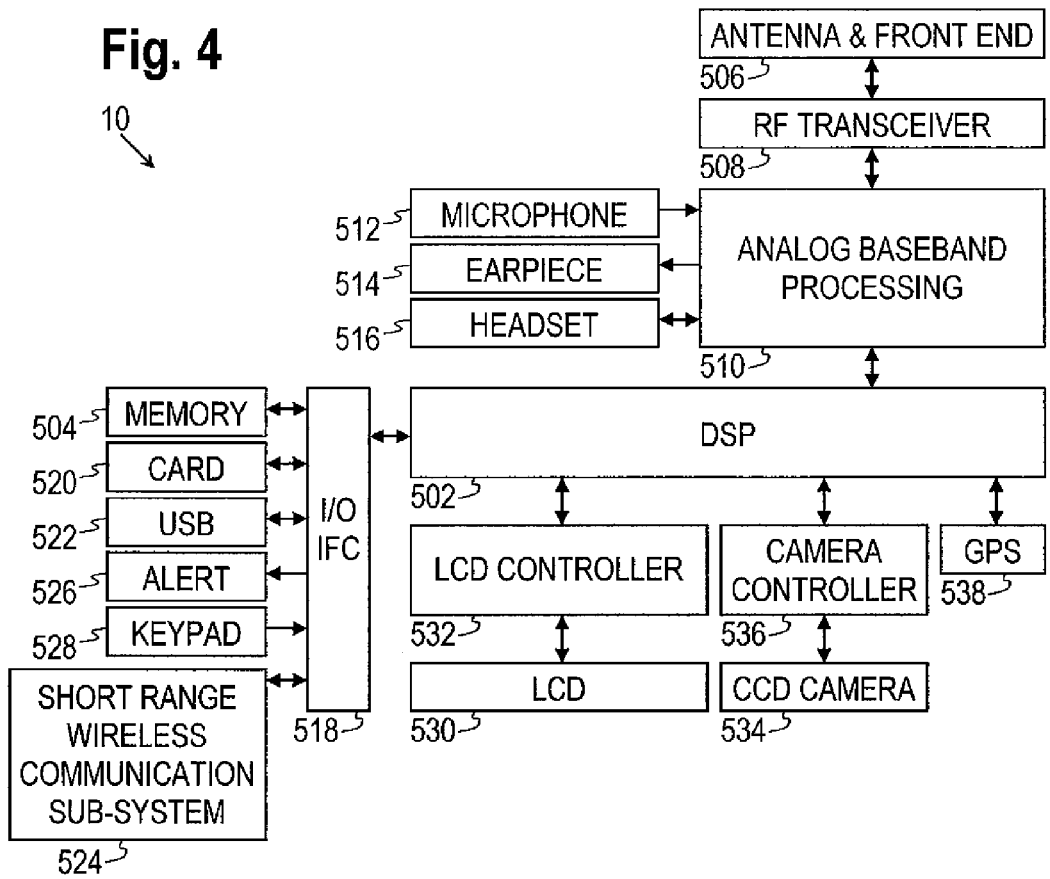
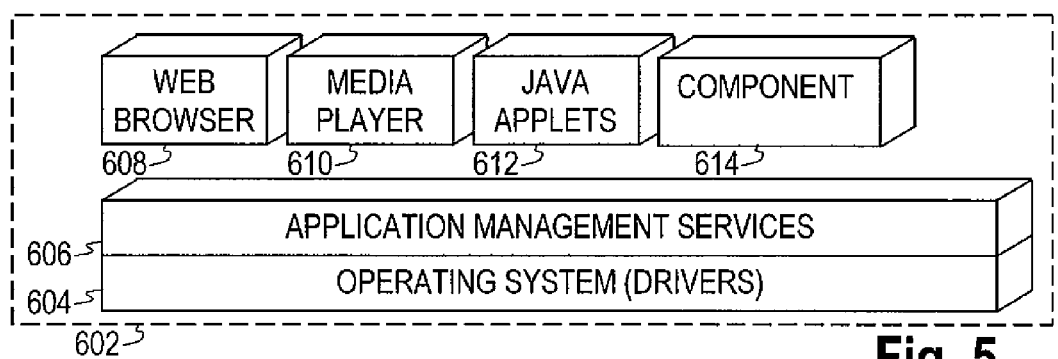
Fig. 5

SAFETY FOR MOBILE DEVICE USERS WHILE DRIVING

BACKGROUND

Easily transportable devices with wireless telecommunications capabilities, such as mobile telephones, personal digital assistants, handheld computers, and similar devices, will be referred to herein as mobile devices. A communications connection between a mobile device and another component might promote a voice call, a text-based message, a file transfer, or some other type of data exchange, any of which can be referred to as a call, a session, or a message.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a block diagram of a mobile device operable for some of the various embodiments of the disclosure.

FIG. 5 is a diagram of a software environment that may be implemented on a mobile device operable for some of the various embodiments of the disclosure.

DETAILED DESCRIPTION

Figure 1:
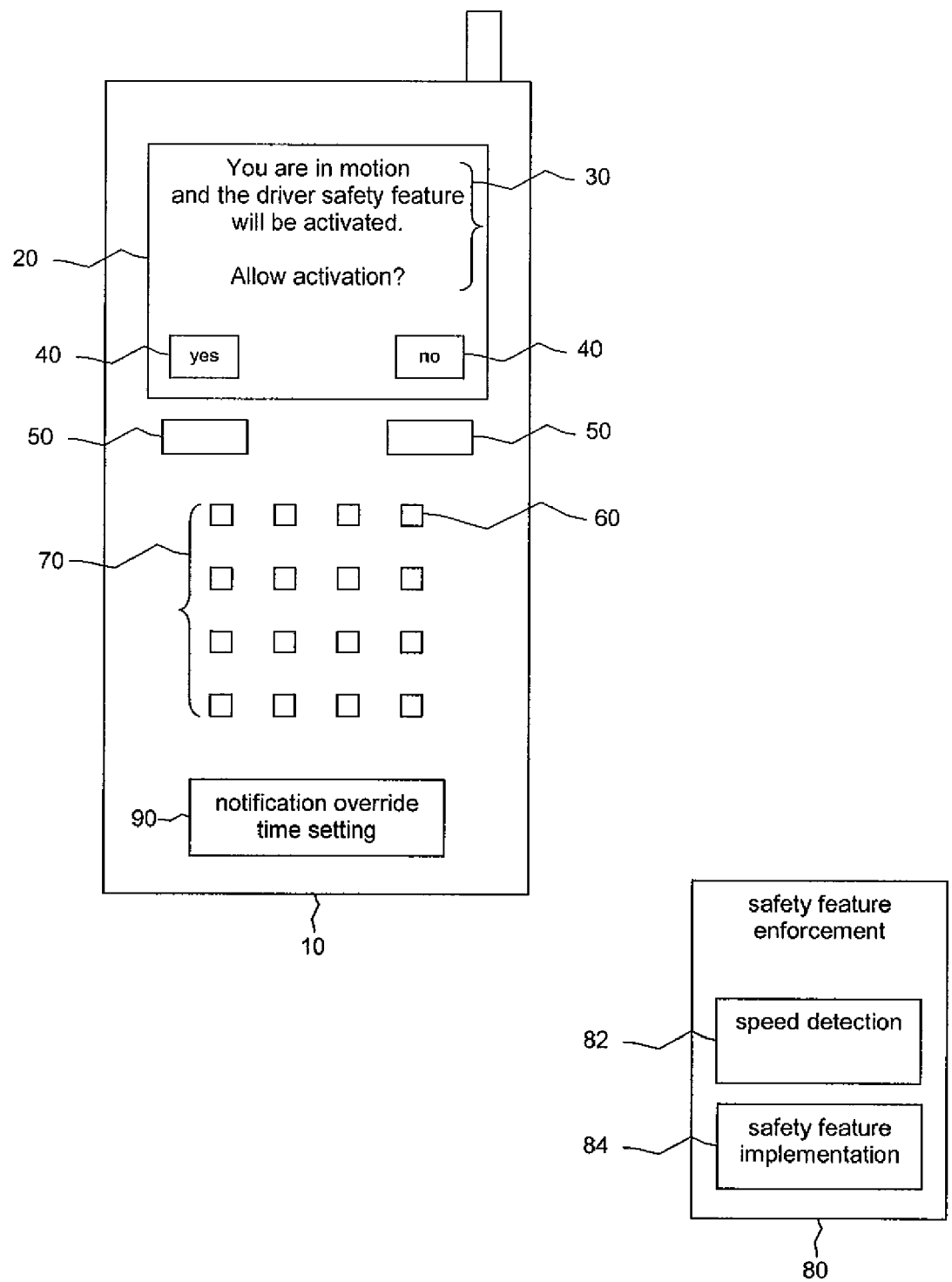
FIG. 1 is a block diagram of a telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a mobile device is provided that is configured to have at least one function disabled when the speed of the mobile device exceeds a threshold. The mobile device includes an output component configured to provide a notification related to disabling the at least one function. The mobile device also includes a first input component configured to promote controlling whether to disable the at least one function.

In another embodiment, a system is provided. The system includes a speed detection component configured to determine a speed at which a mobile device is moving. The system also includes a safety feature implementation component configured to disable at least one function of the mobile device when the speed exceeds a threshold. The system also includes an output component on the mobile device configured to provide a notification related to the disablement of the at least one function when the speed exceeds the threshold. The system also includes a first input component on the mobile device configured to promote allowing or overriding the impending disablement.

In an embodiment, a method for promoting the safe use of a mobile device is provided. The method includes determining a speed at which the mobile device is moving. When the speed exceeds a threshold, a notification on the mobile device related to activating a safety feature might be provided. The method further includes controlling whether to activate the safety feature.

Concerns have arisen over the use of mobile devices in moving vehicles. In particular, it has been speculated that drivers using mobile devices might become distracted from vehicle operation and might therefore be more prone to accidents than other drivers. One way of addressing these concerns is by disabling the devices or certain functions of the devices when the devices are in motion. For example, the speed at which a mobile device is moving might be determined by techniques such as using global positioning system (GPS) readings, triangulation, or the number of handoffs of a call between base stations. When the speed of a mobile device is determined to be above a threshold, an assumption can be made that the device is in a moving vehicle. The mobile device's transmitting and/or receiving capabilities might then be disabled, the device's user interface might be disabled, or other restrictions might be placed on one or more of the device's functions.

However, there are situations in which such restrictions may not be appropriate. For example, if it is determined that the mobile device of a passenger in an automobile being driven by another person is in motion, the passenger's mobile device might be disabled. Since the passenger is not involved in the operation of the vehicle, the passenger's use of the mobile device may not pose a safety risk, and there may be no need to disable the passengers mobile device or functions on the device. Similarly, it may be inappropriate to disable the mobile devices of passengers on public transportation vehicles such as buses, trains, and airplanes.

In an embodiment, when a determination is made that a mobile device is in motion above a threshold speed, a user interface on the device can notify the user of the device that a safety feature disabling the device or one or more functions of the device is about to be activated. The user can then be given an opportunity to prevent the safety feature from being activated and allow the mobile device to continue normal operation. The interface that notifies the user of the impending disablement of the mobile device might be a text-based message that appears on the display screen of the device, an automated voice message spoken by the device, an audible, visible, and/or tactile alarm signal, or some other type of output.

Upon receiving this notification, the user can provide an input into the mobile device to prevent the activation of the safety feature. For example, a driver who is willing to accept the safety risk of sending and receiving messages while driving may provide an input to override the safety feature. Alternatively, a driver who is not willing to accept such a risk might choose not to override the safety feature. Alternatively, a passenger in an automobile being driven by another person or in a public transportation vehicle may not be an appropriate target for the safety feature and may choose to prevent the activation of the safety feature. A mobile device would continue its normal operation in such cases, and none of its functions would be disabled. The input might be a press of a button on the mobile device's keypad, a touch of an area on a touch-sensitive screen on the device, a voice command spoken into the device, or some other type of input.

In an embodiment, after the mobile device provides the notification of the impending activation of the safety feature, the user may have a limited amount of time in which to prevent the activation. If the user provides an input to override the safety feature within this time period, the safety feature is not activated and the device acts in its usual manner. If the user does not override the safety feature within the time period, the safety feature is activated and restrictions are placed on the capabilities of the mobile device. The device may give the user the capability to specify the length of the time period in which activation of the safety feature can be prevented. The device may also give the user the capability to specify a key or keystroke sequence that can be used to prevent activation of the safety feature.

In an alternative embodiment, the mobile device might simply provide a notification that the device is moving at a speed greater than the threshold. The user may then take an action to activate the safety feature or may take no action and leave the safety feature inactivated.

In an embodiment, the restrictions remain in effect as long as the mobile device is determined to be in motion above the threshold speed. If the mobile device's speed drops below the threshold, the restrictions might be lifted and the device might return to normal operation. In some circumstances, the mobile device's speed may fluctuate above and below the threshold numerous times in a short period of time. For example, the speed of a mobile device of a user who is driving or riding in heavy traffic on a city street might drop below the threshold each time the user stops at a traffic light and might exceed the threshold each time the user accelerates away from a traffic light. The user might become distracted or annoyed by receiving and responding to a notification of an impending activation of the safety feature each time the mobile device's speed exceeds the threshold.

In an embodiment, the mobile device can provide the user with the capability to set a time period during which the mobile device should not provide the notifications to the user and during which the safety feature is to remain active or is to remain inactive. If the user specifies that the safety feature is to remain active, the user is not given an opportunity to override the safety feature during this time, and one or more functions of the mobile device will be disabled each time the device's speed exceeds a threshold. If the user specifies that the safety feature is to remain inactive, no functions of the mobile device will be disabled during this time, even when the device's speed exceeds a threshold. In some cases, the user might first specify a period of time during which notifications are not to be provided, and then might specify whether the safety feature is to remain active or inactive during this time. In other cases, the user might specify a period of time during which the safety feature is to remain inactive. No notifications about the safety feature would be made in such cases.

As an example, a user might be aware that his or her morning commute typically lasts about 30 minutes and typically involves stopping at several traffic lights. The user might wish to avoid receiving multiple notifications about impending function disablements during this time. Before beginning the commute, the user might provide an input into the mobile device specifying that the safety feature is to remain deactivated for the next 30 minutes. No functions of the mobile device would be disabled and no notifications about the safety feature would be made for the next half hour. Alternatively, the user might specify that no notifications about the impending activation of the safety feature are to be made for the next 30 minutes but that the safety feature is to remain in effect. That is, for that next 30 minutes, one or more functions of the mobile device would be disabled each time the mobile device's speed exceeded a threshold, and the user would not be given an opportunity to override these disablements. Either option would prevent the user from receiving multiple notifications due to multiple stops and starts during the commute.

As another example, a mobile device user might be aware that he or she will be alternating between periods of driving or riding and periods of stopping throughout an upcoming work day. Such a user might specify that the safety feature should remain deactivated for an upcoming eight-hour period. The user would then receive no safety feature-related notifications during the work day. Alternatively, the user might specify that no notifications are to be made during an upcoming eight-hour period. The user might then specify whether the safety feature is to be active or inactive during that period.

As another example, a mobile device user might take a trip to a city where he or she will not be driving at all throughout the entire trip. There would be no need for the safety feature to be activated for such a user, so the user might specify that the safety feature should be deactivated for the length of the trip. The user would then receive no safety feature-related notifications during the trip.

The restrictions placed on the mobile device when the safety feature is activated can take numerous different forms. In various embodiments, the radio functions of the mobile device remain in effect so that the device can still receive messages, but restrictions are placed on various other capabilities of the device. In some embodiments, restrictions might be placed on a capability of the device to provide information on an output interface of the device. For example, the device might receive text messages, but the display of incoming text messages on the device might be disabled. In some cases, an audible, visible, tactile, or other indication that a text message has been received might be provided even though the text message itself cannot be seen. In another example, the device might receive voice messages, but a ring tone or other indicator of an incoming voice call might be disabled. In some cases, an audible, visible, tactile, or other indication to which the device user cannot respond might be provided to indicate that a voice call has been received.

In alternative or additional embodiments, restrictions might be placed on a capability of the device to respond to certain inputs on an input interface of the device. For example, the capability of the device to respond to one or more inputs into the device's keypad might be disabled. This could prevent a user from retrieving or generating text or voice messages while the safety feature is activated. In some cases, the input restrictions on the device prevent the user from entering text or otherwise responding to incoming text messages even though the incoming text messages are displayed. In another example, the capability of the device to respond to inputs into the device's microphone might be disabled. This could prevent a user from providing voice commands while the safety feature is activated.

In some embodiments, a mobile device that has the safety feature activated might be able to provide an automated response to an incoming call. For example, if a mobile device receives a voice call, an automated voice message can inform the caller that the mobile device user is driving and unable to take the call. The caller might then be transferred to a voice mail system. Alternatively or in addition, if the mobile device receives a text-based message while the safety feature is activated, a text-based message might be automatically sent to the message sender stating that the mobile device user is driving and unable to respond to the sender's text message.

The sender's text message might be made available to the mobile device user at a later time when the safety feature is not activated.

In some embodiments, the safety feature might be temporarily overridden for certain calls. In some cases, a mobile device might give a user the capability to enter the names of individuals from whom calls are always to be accepted, regardless of the activation or deactivation status of the safety feature. For example, the user might specify that calls from certain members of the users family or certain of the users coworkers should be allowed even when the mobile device's safety feature is activated. In other cases, calls that are designated by the caller as being urgent might be passed through to a mobile device even when the device's safety feature is activated.

In some embodiments, data related to the safety feature is captured and retained in a log file or in a similar data retention location. For example, the time when a notification is made regarding an impending activation of the safety feature, the user's response to the notification, instances when the safety feature is activated automatically, instances when the safety feature is activated through an action by the user, and similar information might be recorded. This information might be stored on the mobile device or might be transmitted to another network component for storage elsewhere.

FIG. 1 illustrates an embodiment of a mobile device 10 that might provide the functionality described herein. The mobile device 10 includes a display screen 20 on which a message 30 can be displayed with a statement that the safety feature is about to be activated or a similar statement. In other embodiments, the notification of an impending activation of the safety feature could be conveyed in other manners. The mobile device 10 also includes one or more mechanisms by which a user could respond to the notification message 30. In some cases, the response mechanism might be one or more touch-sensitive areas 40 on the display screen 20 with labels corresponding to response options. A user could respond to the notification message 30 by touching one of the areas 40 appropriate for the user's response. In other cases, the response mechanism might be one or more context keys 50 on the mobile device 10 that can have different functions depending on the current context of the display screen 20. Appropriate temporary labels for the context keys 50 could appear on the display screen 20 when the notification message 30 appears and a user could respond to the notification message 30 by pressing one of the context keys 50 that has a temporary label corresponding to the user's response. In other cases, the response mechanism might be one or more keys 60 on a keypad 70 of the mobile device 10. In other embodiments, the mobile device 10 could have other mechanisms that allow a user to respond to a notification that the safety feature is about to be activated.

In an embodiment, the mobile device 10 includes or has access to a safety feature enforcement component 80 that is capable of determining the speed at which the mobile device 10 is moving. The speed could be determined in one of the ways mentioned above or in some other manner. The safety feature enforcement component 80 might also be capable of implementing the safety feature on the mobile device 10. The safety feature enforcement component 80 might be a single component or might consist of a speed detection component 82 and a safety feature implementation component 84 that may be wholly or partially separate from one another. In various embodiments, the safety feature enforcement component 80 might reside wholly within the mobile device 10, wholly within one or more network components with which the mobile device 10 can communicate, or partially within the mobile device 10 and partially within the network components.

In an embodiment, the mobile device 10 includes a notification override time setting component 90 that allows a user to set a length of time during which notifications regarding the device's safety feature should not be provided. The component 90 can include appropriate input mechanisms that enable a user to specify a time period for preventing the notifications. The component 90 can also include or have access to appropriate processing capabilities to implement the prevention of the notifications for the specified time period. The safety feature may be activated or deactivated throughout the time period when notifications are not provided. The component 90 might be capable of communicating with the safety feature enforcement component 80 in order to implement an override of the safety feature. The safety feature enforcement component 80 and the notification override time setting component 90 might be implemented as hardware, software, or a combination of hardware and software.

Figure 2:
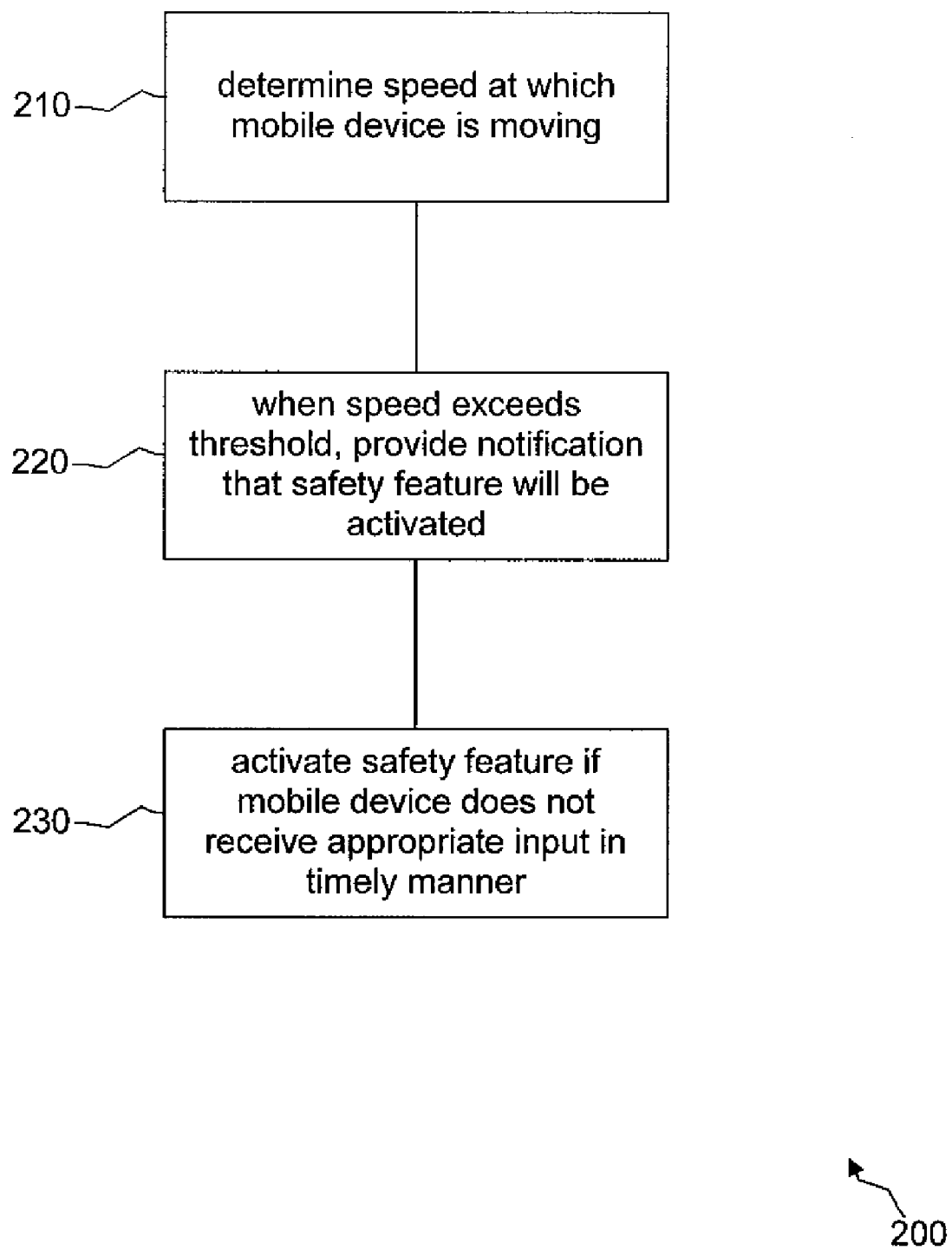
FIG. 2 is a diagram of a method for promoting safe use of a mobile device according to an embodiment of the disclosure.

FIG. 2 illustrates an embodiment of a method 200 for promoting safe use of a mobile device. At block 210, a determination is made of the speed at which the mobile device is moving. At block 220, when the speed exceeds a threshold, a notification is provided on the mobile device that a safety feature is about to be activated. In some embodiments, a check might first be made to determine whether notifications have been temporarily turned off and, if so, the notification would not be made. At block 230, if the mobile device does not receive an appropriate input in a timely manner, the safety feature may be activated.

Figure 3:
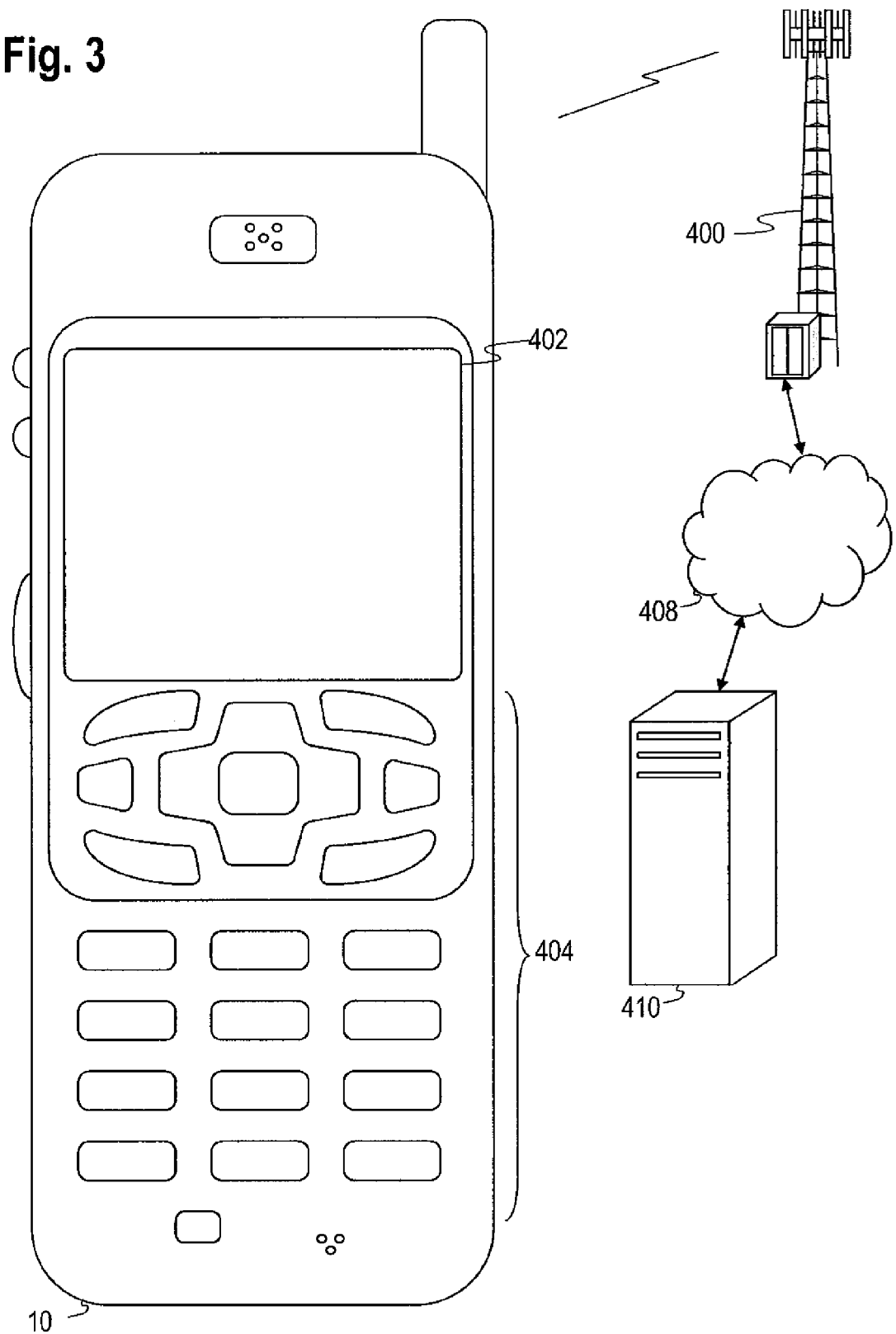
FIG. 3 is a diagram of a wireless communications system including a mobile device operable for some of the various embodiments of the disclosure.

FIG. 3 illustrates a wireless communications system including an embodiment of the mobile device 10. The mobile device 10 is operable for implementing aspects of the disclosure, but the disclosure should not be limited to these implementations. Though illustrated as a mobile phone, the mobile device 10 may take various forms including a wireless handset, a pager, a personal digital assistant (PDA), a personal entertainment device, a portable computer, a tablet computer, or a laptop computer. Many suitable devices combine some or all of these functions. In some embodiments of the disclosure, the mobile device 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the mobile device 10 may be a portable, laptop or other computing device. The mobile device 10 may support specialized activities such as gaming, inventory control, job control, and/or task management functions, and so on.

The mobile device 10 includes a display 402, which might be substantially similar to the display 20 of FIG. 1. The mobile device 10 also includes a touch-sensitive surface, a keyboard or other input keys generally referred as 404 for input by a user. These components might be substantially similar to the keys 60 and keypad 70 of FIG. 1. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Alternatively, the input keys might be touch-sensitive areas within the display 402. The mobile device 10 may present options for the user to select, controls for the user to actuate, and/or cursors or other indicators for the user to direct.

The mobile device 10 may further accept data entry from the user, including numbers to dial or various parameter values for configuring the operation of the mobile device 10. The mobile device 10 may further execute one or more software or firmware applications in response to user commands. These applications may configure the mobile device 10 to perform various customized functions in response to user interaction. Additionally, the mobile device 10 may be programmed and/or configured over-the-air, for example from a wireless base station, a wireless access point, or a peer mobile device 10.

Among the various applications executable by the mobile device 10 are a web browser, which enables the display 402 to show a web page. The web page may be obtained via wireless communications with a wireless network access node, a cell tower, a peer mobile device 10, or any other wireless communication network or system 400. The network 400 is coupled to a wired network 408, such as the Internet. Via the wireless link and the wired network, the mobile device 10 has access to information on various servers, such as a server 410. The server 410 may provide content that may be shown on the display 402. Alternately, the mobile device 10 may access the network 400 through a peer mobile device 10 acting as an intermediary, in a relay type or hop type of connection.

FIG. 4 shows a block diagram of the mobile device 10. While a variety of known components of mobile devices 10 are depicted, in an embodiment a subset of the listed components and/or additional components not listed may be included in the mobile device 10. The mobile device 10 includes a digital signal processor (DSP) 502 and a memory 504. As shown, the mobile device 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD) or other display, which may include a touch sensitive surface 530, an LCD controller 532, a charge-coupled device (CCD) camera 534, a camera controller 536, and a global positioning system (GPS) sensor 538. In an embodiment, the mobile device 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 10 to send and receive information from a cellular network or some other available wireless communications network or from a peer mobile device 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the mobile device 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short-range wireless communication sub-system 524. The USB interface 522 may be used to charge the mobile device 10 and may also enable the mobile device 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the mobile device 10 to communicate wirelessly with other nearby mobile devices and/or wireless base stations.

The input/output interface 518 may further connect the DSP 502 to the alert 526 that, when triggered, causes the mobile device 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the mobile device 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the mobile device 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the mobile device 10 to determine its position. Various other peripherals may also be included to provide additional functions, e.g., radio and television reception.

FIG. 5 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the mobile device 10. Also shown in FIG. 5 are a web browser application 608, a media player application 610, and Java applets 612. The web browser application 608 configures the mobile device 10 to operate as a web browser, allowing a user to enter information into forms and select links to retrieve and view web pages. The media player application 610 configures the mobile device 10 to retrieve and play audio or audiovisual media. The Java applets 612 configure the mobile device 10 to provide games, utilities, and other functionality. One or more components 614 might provide functionality related to speed measurement, disablement of device features, and/or overriding of the disablement of device features.

Figure 6:
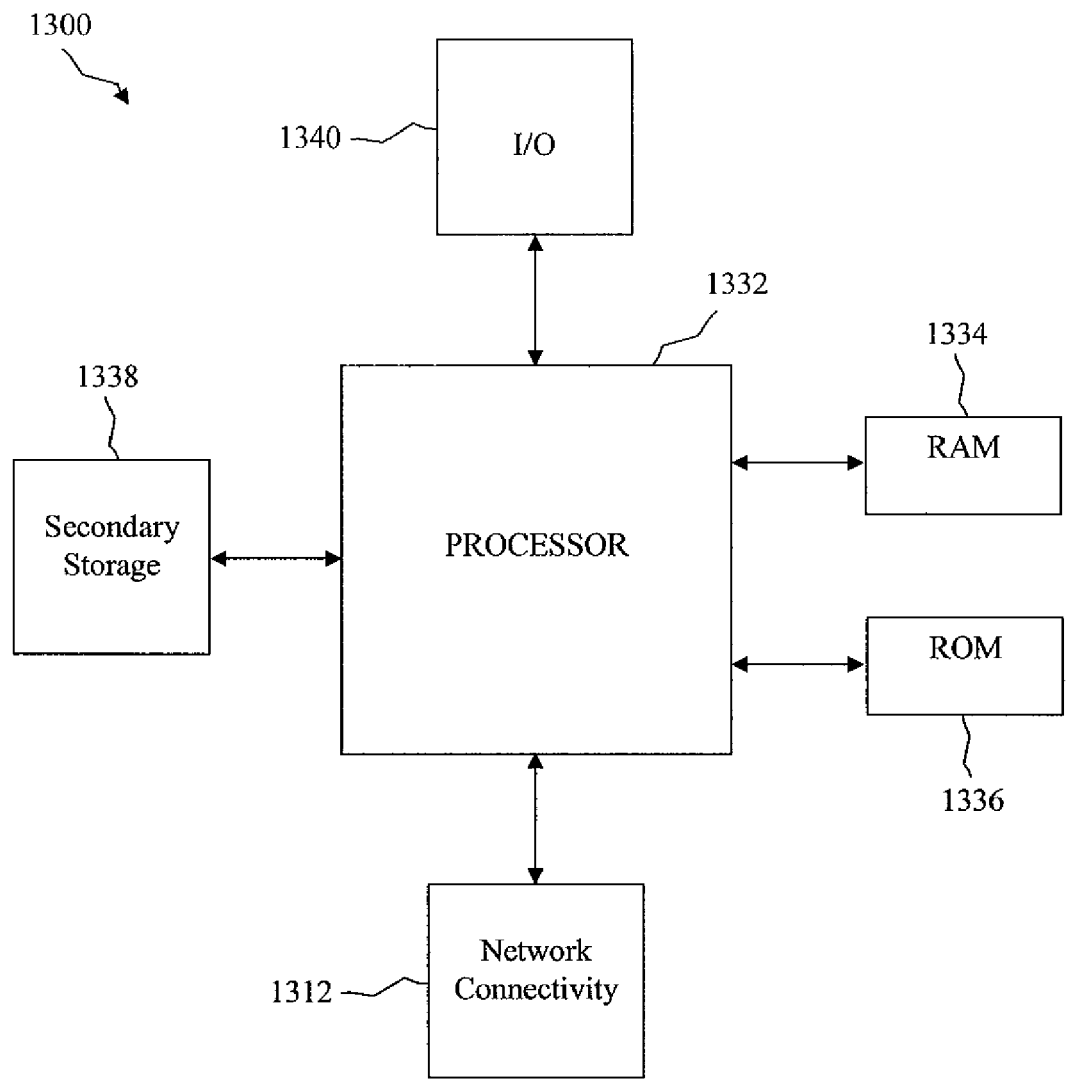
FIG. 6 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs which are loaded into RAM 1334 when such programs are selected for execution. The ROM 1336 is used to store instructions and perhaps data which are read during program execution. ROM 1336 is a non-volatile memory device which typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with an Internet or one or more intranets. With such a network connection, it is contemplated that the processor 1332 might receive information from the network, or might output information to the network in the course of performing the above-described method steps. Such information, which is often represented as a sequence of instructions to be executed using the processor 1332, may be received from and outputted to the network, for example, in the form of a computer data signal embodied in a carrier wave. The network connectivity devices 1312 may also include one or more transmitter and receivers for wirelessly or otherwise transmitting and receiving signal as are well know to one of ordinary skill in the art.

Such information, which may include data or instructions to be executed using the processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, scripts which it accesses from hard disk, floppy disk, optical disk (these various disk based systems may all be considered secondary storage 1338), ROM 1336, RAM 1334, or the network connectivity devices 1312. While only one processor 1332 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A device comprising:
   a first component configured to:
      provide a notification related to disabling at least one function when a speed of the device exceeds a threshold;
      provide an option to prevent disabling of the at least one function;
   a second component configured to:
      receive an override input to activate the option, wherein the override input comprises a time period during which disabling of the at least one function is inactive;
      control whether to disable at least one function based on the override input;
   wherein disabling the at least one function is prevented when the override input is received within a specified time period of providing the notification.

2. The device of claim 1, wherein the notification is at least one of: a text-based message; a voice-based message; an audible alarm; a visible alarm; and a tactile alarm.

3. The device of claim 1, wherein, when the device does not receive the override input within a specified time period, the at least one function is disabled.

4. The device of claim 1, wherein the override input comprises a time period during which providing the notification is inactive.

5. The device of claim 1, wherein the at least one function that is disabled is at least one of: a capability to provide information on an output interface on the device; and a capability to input into an input interface on the device.

6. The device of claim 1, wherein, when at least one function is disabled, an automated message related to the disabled function is provided to a sender of an incoming message or call.

7. The device of claim 1, wherein the disabling of the at least one function is overridden for at least one of: a call from a pre-specified individual; and a call designated as urgent.

8. The device of claim 1, wherein the override input comprises a time period during which the disabling of the at least one function and providing the notification are inactive.

9. A system comprising:
   a speed detection component configured to determine a speed at which a device is moving;
   a safety component configured to disable at least one function of the device when the speed exceeds a threshold;
   a first output component configured to provide a notification related to disabling the at least one function when the speed exceeds the threshold;
   a second output component configured to provide an option to prevent disabling of the at least one function;
   a first input component configured to receive an override input to enable the option;
   an override component configured to override the disabling of the at least one function based on the override input when the override input is received within a specified time period of providing the notification.

10. The system of claim 9, wherein the override input comprises a time period during which disabling of the at least one function is inactive.

11. The system of claim 9, wherein the override input comprises a time period during which providing the notification is inactive.

12. The system of claim 9, wherein, when the override input is not received within a specified time period, the at least one function is disabled.

13. The system of claim 9, wherein the override input comprises a time period during which disabling of the at least one function is prevented and providing the notification is prevented.

14. The system of claim 9, wherein the override input comprises a time period during which the at least one function is disabled and providing the notification is prevented.

15. The system of claim 9, wherein the function that is disabled is at least one of: a capability to provide information on an output interface on the device; and a capability to input into an input interface on the device.

16. The system of claim 9, wherein data related to implementation of the safety feature is captured and retained.

17. A method comprising:
   determining a speed at which a device is moving;
   when the speed exceeds a threshold, providing, by the device, a notification related to activating a safety feature;
   providing an option to inactivate the safety feature;
   receiving an override input to engage the option, wherein the override input comprises a time period during which the safety feature is deactivated;
   controlling whether to activate the safety feature based on the override input.

18. The method of claim 17, further comprising activating the safety feature when the override input is not received within a specified time period and deactivating the safety feature when the override input is received within a specified time period.

19. The method of claim 17, wherein the safety feature is at least one of: a disablement of a user interface on the device; a disablement of a text-based message sending capability of the device; and a disablement of a voice-based message sending capability of the device.

20. The method of claim 17, wherein the override input comprises a time period during which the providing the notification is prevented.

21. The method of claim 17, wherein, when the safety feature is activated an automated message related to the safety feature is provided to a sender of an incoming message or call.

22. The method of claim 17, wherein data related to implementation of the safety feature is captured and retained.

\* \* \* \* \*